Dec. 31, 1957   N. D. LEVIE   2,818,038
RUFFLING MACHINE FOR MAKING RUBBER GREENS
Filed June 1, 1953   5 Sheets-Sheet 1
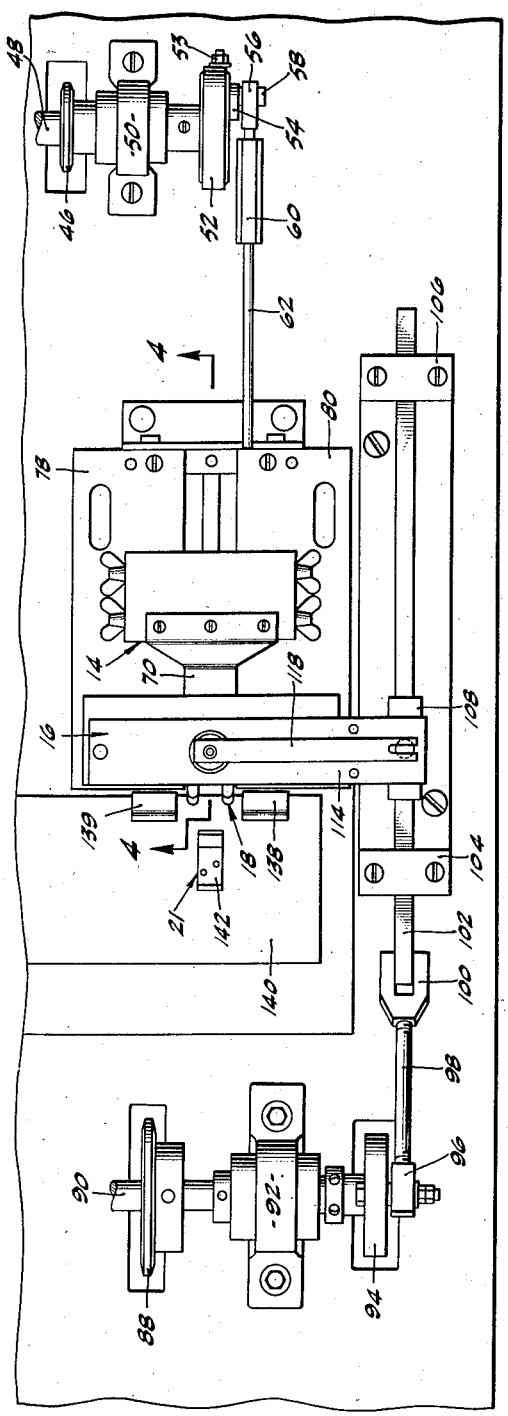
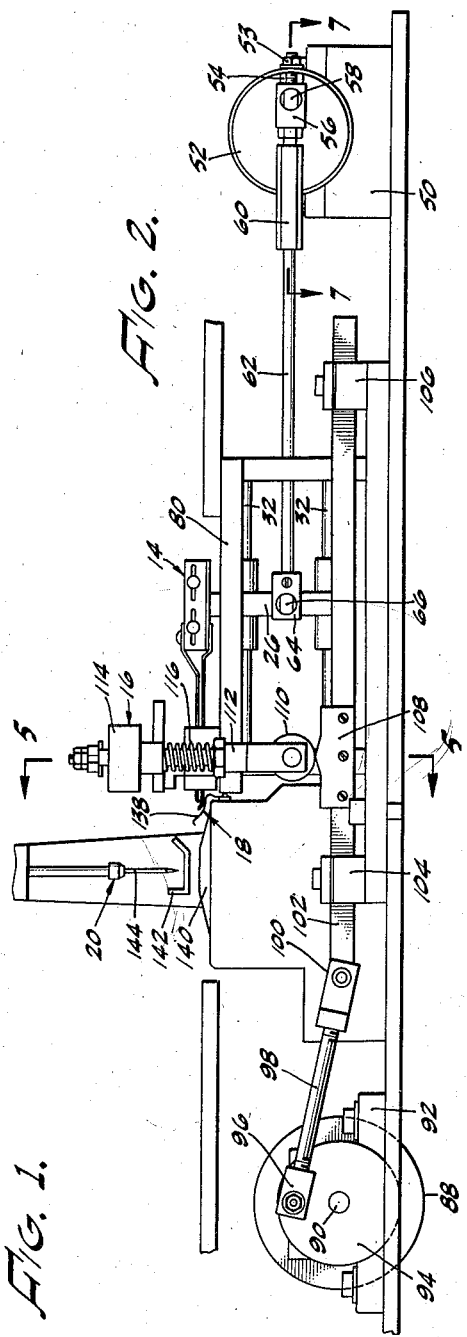
INVENTOR.
NOLA D. LEVIE
BY Lyon & Lyon
ATTORNEYS Dec. 31, 1957   N. D. LEVIE   2,818,038
RUFFLING MACHINE FOR MAKING RUBBER GREENS
Filed June 1, 1953   5 Sheets-Sheet 2
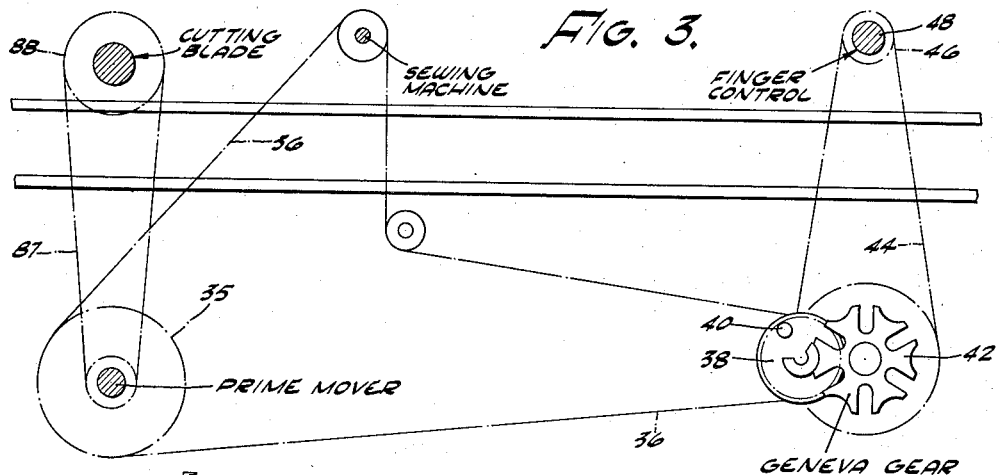
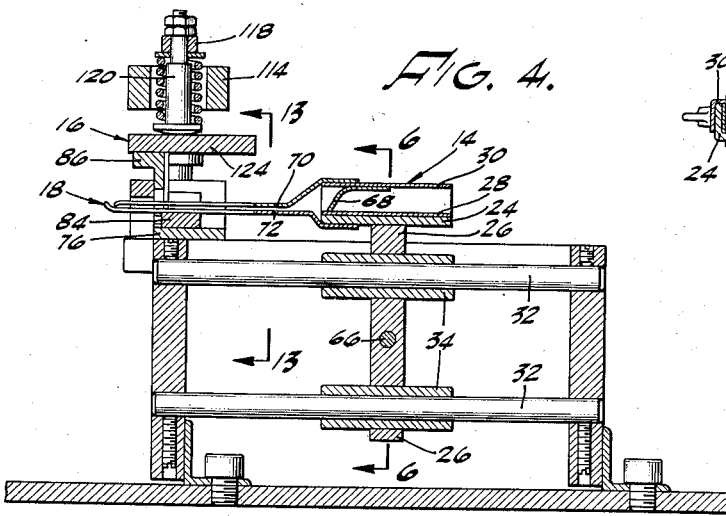
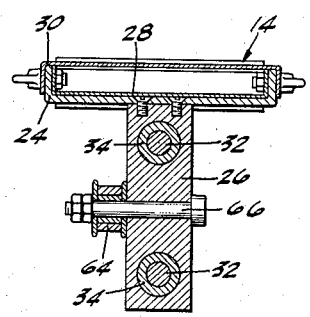
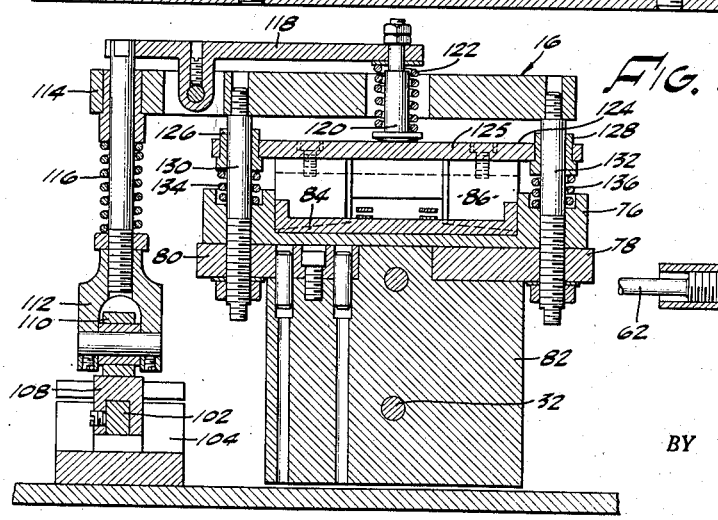
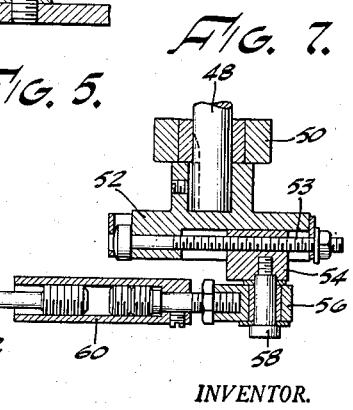
INVENTOR.
NOLA D. LEVIE
BY
Lyon & Lyon
ATTORNEYS

INVENTOR.
NOLA D. LEVIE

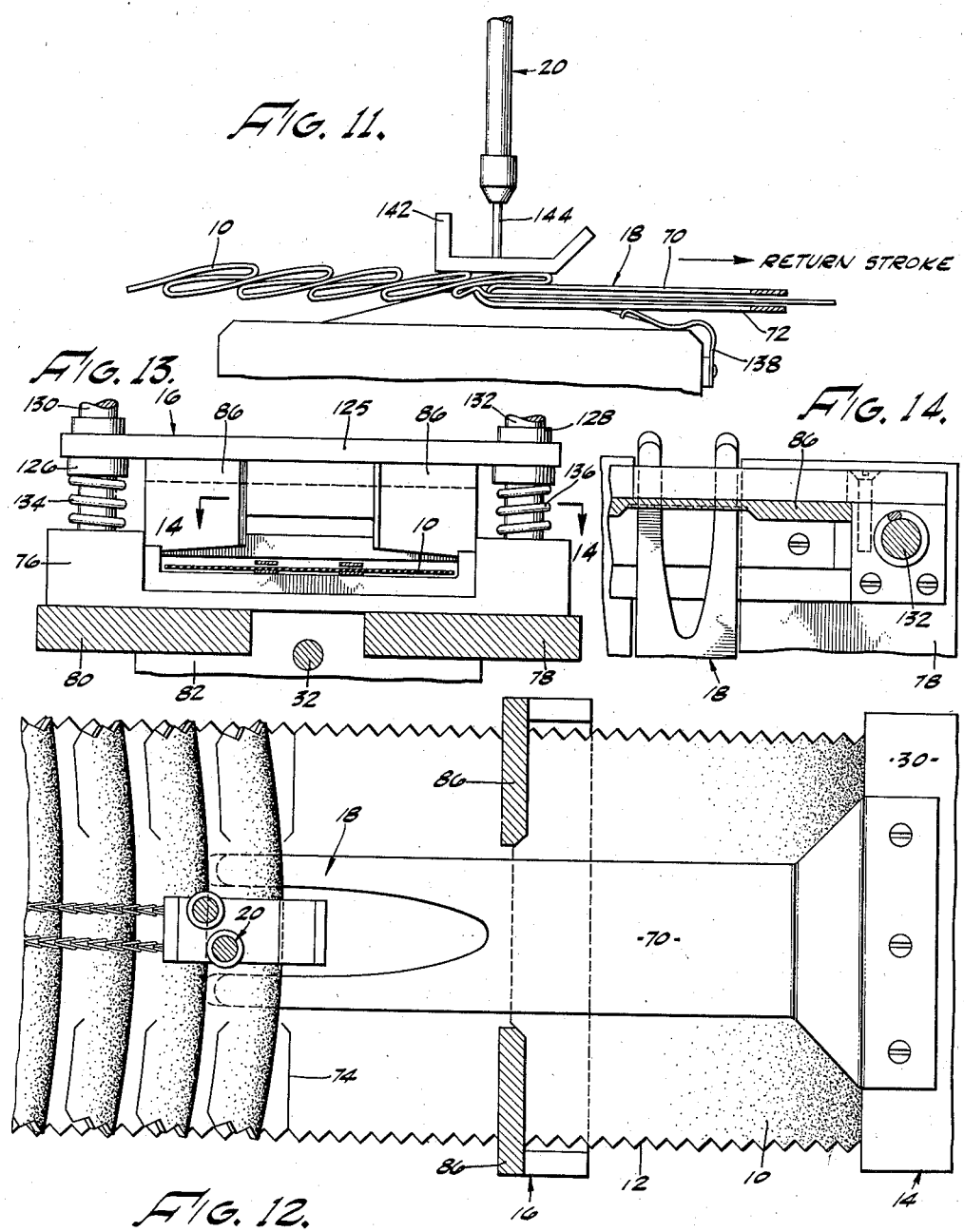

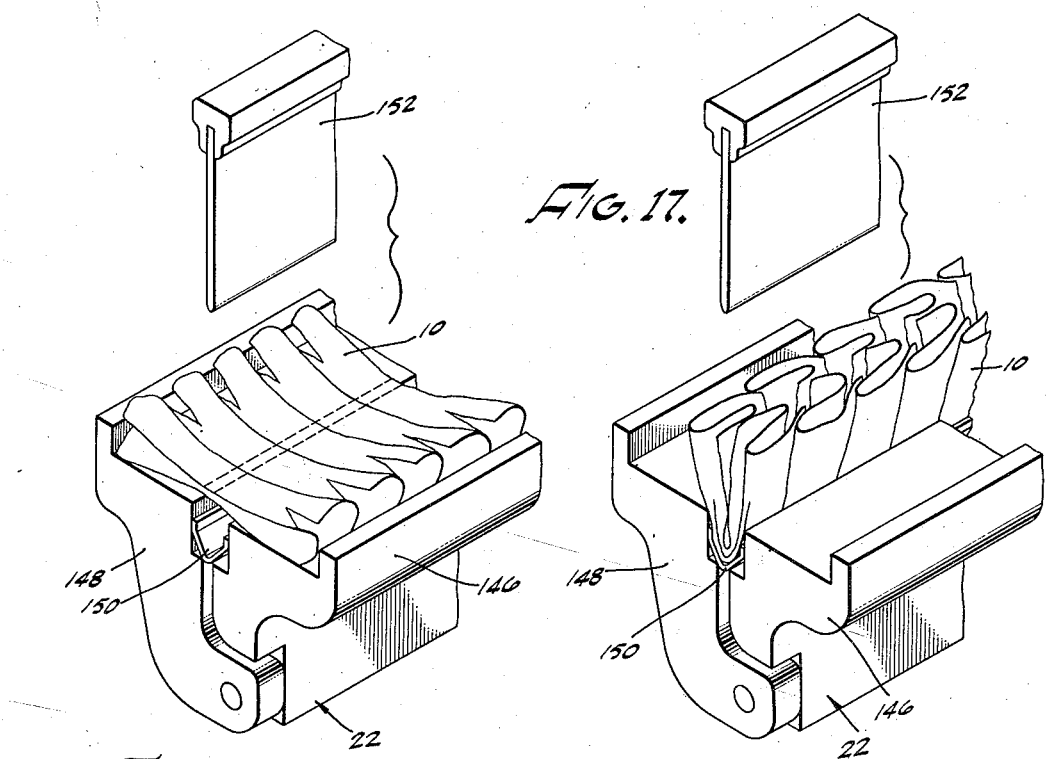
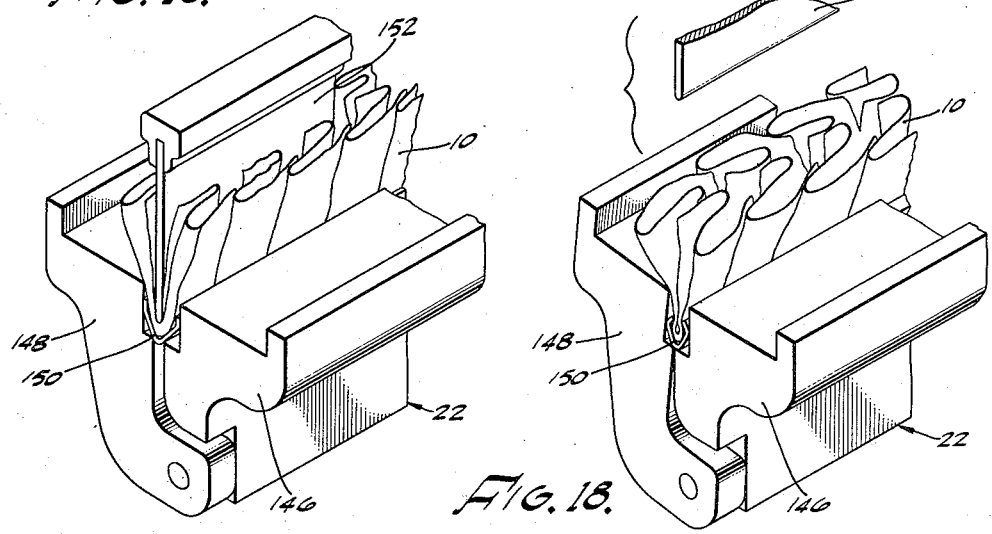

United States Patent Office 2,818,038
Patented Dec. 31, 1957

2,818,038

RUFFLING MACHINE FOR MAKING RUBBER GREENS

Nola D. Levie, Los Angeles, Calif., assignor to McClintock Manufacturing Co., Los Angeles, Calif., a corporation of California Application June 1, 1953, Serial No. 358,602

6 Claims. (Cl. 112—132)

This invention relates to a machine for making decorative stripping.

It is frequent practice in mechandising meats to divide the display surface into compartments by decorative stripping frequently referred to as rubber greens or imitation parsley.

It is an object of this invention to provide a machine for manufacturing such decorative stripping.

It is a further object of this invention to provide a machine wherein suitable pliable material is fed to the machine gathered, cut, stitched to form a suitable decorative stripping and to apply a base thereto to retain such stripping in a useable formation.

Other objects and advantages of this invention will be readily apparent from the following description.

In the drawings:

Figure 1 is a plan view of the machine.

Figure 2 is a side elevation of the machine.

Figure 3 is a schematic view of the driving means.

Figure 4 is a section taken along line 4—4 of Figure 1 with the sewing attachment removed.

Figure 5 is a section taken along line 5—5 of Figure 2.

Figure 6 is a section taken along line 6—6 of Figure 4.

Figure 7 is a section taken along line 7—7 of Figure 2.

Figure 11 is a view similar to Figure 8 at the beginning of the return stroke of the fingers.

Figure 12 is a plan view of the sewing section.

Figure 13 is a section taken along line 13—13 of Figure 4.

Figure 14 is a section taken along line 14—14 of Figure 13.

Figure 15 is a diagrammatic view of the base applying mechanism.

Figure 16 is a view similar to Figure 15 illustrating the action of the blade.

Figure 17 is a view similar to Figure 15 illustrating the withdrawal of the blade.

Figure 18 is a view similar to Figure 15 illustrating application of the base.

Figure 8:
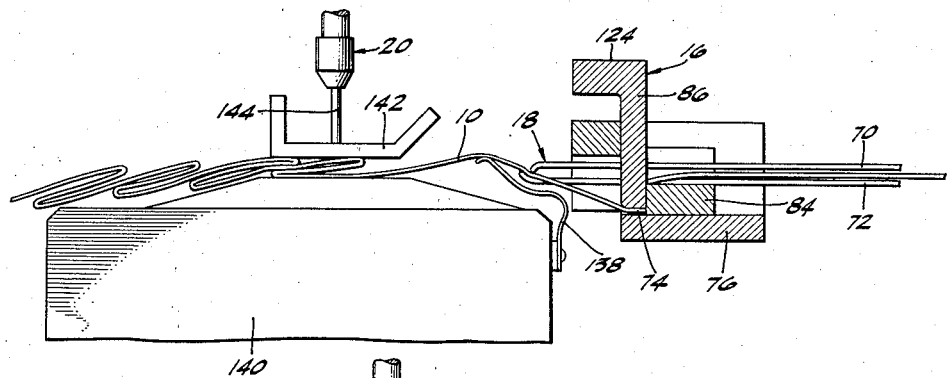
Figure 8 is a fragmentary side section illustrating the stitching mechanism with the fingers retracted.

The machine illustrated in the drawings and hereinafter described is adapted to manufacture decorative stripping or rubber greens of the type described in the copending applications, Serial Number 349,724, now Patent No. 2,739,502, and Serial Number D. 24,558 of Warren M. Hubbard and Nola D. Levie.

A suitable material preferably a soft pliable rubber 10 is fed to the machine from any suitable source in the form of a continuous band or strip. It is preferred that the rubber strip be green in color with its edges serrated as at 12, for decorative purposes (see Fig. 12).

The rubber strip is fed through a guide generally designated 14, from which it is delivered to a cutting mechanism, generally designated 16, then to a folding mechanism, generally designated 18, then to a stitching mechanism, generally designated 20 and finally to a base applying mechanism, generally designated 22.

The guide 14 is formed of a channel member 24 which is bolted to the upper extremity of a post 26. Mounted inside channel 24 is a second upturned channel 28 which preferably has a smooth polished surface to offer the least frictional resistance to the strip which moves across this channel. A down-turned channel 30 forms a cover for the guide and all three channels are secured together by suitable bolts.

Mounted in the frame of the machine are a pair of rods 32 which act as guides for sleeves 34 on post 26. The guide 14 is reciprocated from left to right in Figs. 1 and 2 by means of a suitable motor 35. The motor through chain 36 drives the plate 38 by means of pin 40, which pin in turn drives Geneva gear 42. The intermittent movement of the Geneva gear is transmitted through chain 44 to sprocket 46.

Sprocket 46 is mounted upon a shaft 48 which is supported by bearing 50 and rotates a disk 52. Movably secured in disk 52 by a screw 53 is a block 54 which is adjustable therein by rotation of screw 53. The block 54 has fixed thereto a second block 56 by means of screw 58, which block 56 is secured to one leg of turnbuckle 60. The other leg 62 of the turnbuckle has a block 64 thereon which block is secured by pin 66 to post 26. Thus rotation of disk 52 is translated to reciprocation of the guide 14 toward and away from the sewing mechanism 20. By adjusting the block 54 in disk 52 the length of the stroke of guide 14 can be varied and by adjusting turnbuckle 60 the center of the stroke can be varied.

Inside the guide 14 secured to the channel 30 is a spring 68 which engages the channel 28. The rubber strip is fed between the spring and channel 28 to insure a smooth continuous feeding of the strip. Carried by the guide 14 are upper finger 70 and lower finger 72, which are forked at their leading extremity. The tip of the upper finger is slightly downturned while the tip of the lower finger is curved slightly upward and projects a short distance in advance of the tip of the upper finger. The decorative stripping is trained between the upper and lower fingers and is presented thereby to the sewing mechanism.

Prior to the sewing step the decorative strip is cut as indicated at 74 to facilitate formation of the finished product, as more fully described in my copending application Serial Number 349,724.

A channel shaped guide 76 is mounted between plates 78 and 80 which plates are supported by spaced vertical supports such as 82. Mounted inside guide 76 is a second channel 84 upon which lower finger 72 rests. The knife 86 is raised and lowered in the desired timed relationship with respect to the movement of the decorative strip to form the cuts 74 and its blade is formed to make a cut such as 74 in each side of strip 10.

The knife actuating mechanism is driven by chain 87 trained between a suitable sprocket driven by motor 35 and sprocket 88. Sprocket 88 is mounted upon shaft 90 which is supported by bearing 92. A disk 94 is rotated by shaft 90 and said disk carries a block 96, which is offset from the center of the disk. The block 96 is attached to one extremity of rod 98, which rod terminates in an elbow joint 100. The rod 102 forms the other half of the elbow joint so that rotary movement of the disk 94 is converted to reciprocal linear movement of rod 102 in guides 104 and 106. The rod 102 carries a cam 108 which engages cam follower 110 and reciprocates same vertically. The cam follower is supported between the forked end of the knife actuating rod 112, which is journalled in plate 114 and urged downwardly by spring 116.

The upper extremity of rod 112 is secured to lever 118, which is pivotally mounted upon plate 114 and carries at its other end a plunger 120 which is urged by spring 122 downwardly. The plunger 120 projects through a suitable aperture in plate 114 and engages the upper surface 124 of knife 86.

The bar 125 has a pair of sleeves 126 and 128 which slide upon posts 130 and 132, depending from plate 114 guiding movement of the knife. The posts 130 and 132 have their lower extremities projecting through channel shaped guide 76 and anchored in plates 78 and 80. Each post has a spring 134 and a spring 136 thereon which contact sleeves 126 and 128 urging the knife 86 upwardly.

The knife shape is best seen in Figs. 13 and 14, being thick at each side and thin in the middle, with the central section cut away at the bottom edge to provide for opposed cuts such as 74.

As previously described the knife is driven in timed relation with respect to the movement of the strip 10 through the machine. As more fully set forth in my copending application, after the strip has been cut it is folded into three superimposed layers and stitched. The folding is accomplished by means of fingers 70 and 72 in combination with springs 138 and 139, which springs are mounted upon the anvil 140 of the sewing mechanism.

Figure 9:
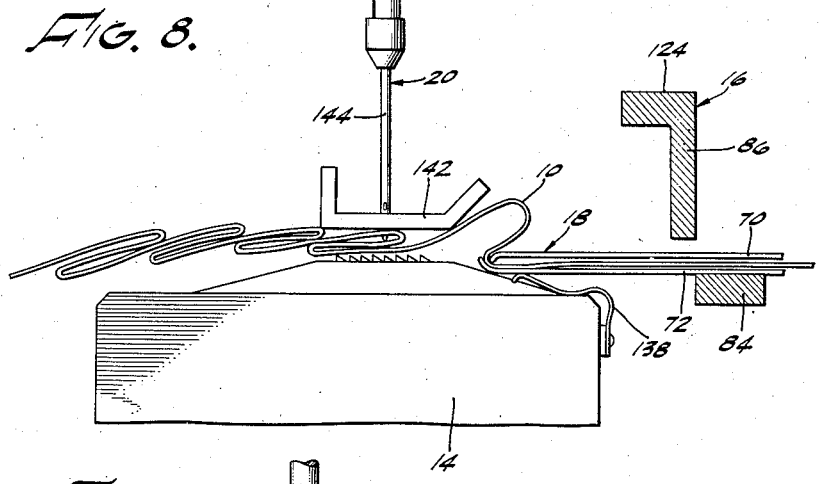
Figure 9 is a view similar to Figure 8 with the fingers partially advanced.
Figure 10:
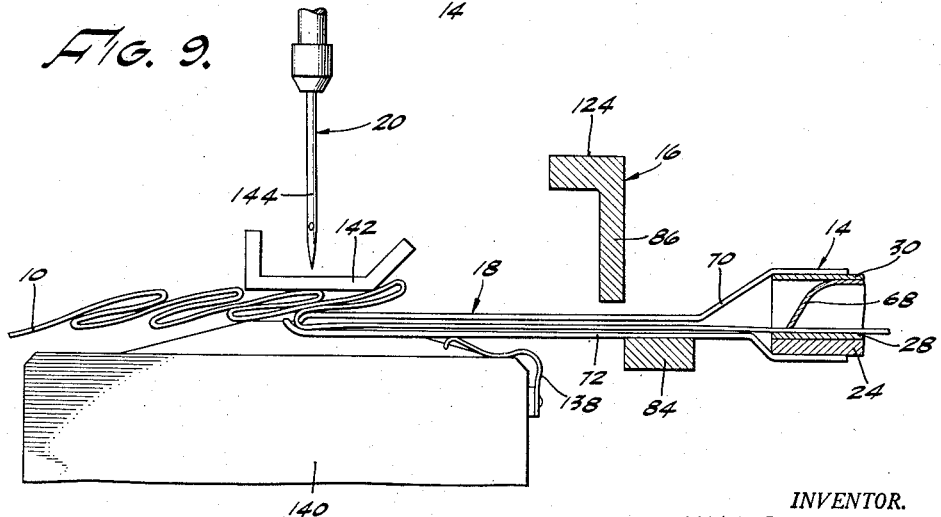
Figure 10 is a view similar to Figure 8 with the fingers fully advanced.

As the fingers 70 and 72 commence their forward stroke as seen in Fig. 8, the spring 138 retains the strip above the level of the fingers. As seen in Fig. 9, the finger 72 contacts the spring and moves it out of the path of the fingers, with the result that a loop forms above finger 70. The fingers further advance as viewed in Fig. 10, delivering the fold beneath the foot 142 of the sewing mechanism. The sewing mechanism is of any conventional type and hence will not be described in detail. When the folded material is thus delivered to the needle 144 the timing of the Geneva drive permits the fingers to remain stationary while the needle 144 lowers into the strip before commencing the return stroke of the fingers. The sewing mechanism then functions to stitch the strip in two lines each offset an equal amount from the center of the strip. The sewing mechanism also functions to draw the strip through the machine in the conventional manner.

It is to be noted that the cuts 74 fall slightly behind the leading edge of each fold as more fully set forth in the above referred to copending applications, Serial No. 349,724 and Serial No. D. 24,558. Since the sewing mechanism is also driven through chain 36 by motor 35, the timing between the cutting, folding and stitching steps is readily controlled.

After sewing the decorative stripping is delivered to a pair of jaws 146 and 148 which are pivoted together and recessed to receive metal base 150. A blade 152 is lowered to engage the strip 10 adjacent its center and force same into base 150 as seen in Fig. 16. The blade is then raised as seen in Fig. 17 and the jaws pivoted together as seen in Fig. 14, crimping the base 150 onto strip 10. In this manner the completed product is formed.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. A machine for manufacturing decorative stripping from a band comprising a sewing machine, intermittently reciprocating feeding means for presenting said band to the sewing machine for stitching said band along a line centrally of the longitudinal edges of said band, including a pair of fingers movable in a path lengthwise of said band toward and away from the sewing machine and between which fingers said band is trained so as to expose opposite marginal portions of the band along its longitudinal edges beyond the corresponding edges of said fingers, a cutter supported for movement between raised and lowered positions in timed relation with movement of said feeding means, said cutter having a pair of cutting edges arranged along a line drawn across the path of movement of the fingers at such distance apart as to straddle the fingers and cut only said marginal portions of the band when said cutter is in lowered position, means located in the path of movement of the fingers operable to lift the portion of the band between the sewing mechanism and the leading end of the fingers and cooperating with said fingers during movement of the latter toward the sewing machine to form a transverse fold in the band with each of such movements of the finger.

2. A machine as described in claim 1, wherein mechanism is provided for folding said band along the line of stitching and for applying a separate binding member to the band, said mechanism including a pair of jaws across which the band moves as it is discharged from the sewing machine, said jaws being divided along a line in longitudinal alignment with the line of stitching in the band and defining a pocket in which the band is adapted to have limited entry to cause said band to be folded along said line of stitching and in which a binding member is adapted to be positioned in embracing relation to the portion of the band in said pocket, said jaws being operable to establish crimped engagement of said binding member against the band portion embraced thereby to prevent unfolding of the band at said latter line of fold.

3. A machine as claimed in claim 1 wherein the cutter is located in such relation to the length of travel of the fingers as to cause the line of each transverse fold in the band to be offset lengthwise of the band in relation to the cut formed by the cutter in the portion of the band containing such transverse fold when such folds are acted upon by the sewing machine.

4. A machine as claimed in claim 1, wherein the leading end of one of said fingers is curved slightly inwardly and projects forwardly beyond the leading end of the other finger.

5. A machine as claimed in claim 1, wherein means located at the discharge end of the sewing machine are operative to fold the sewed band along the line of stitching and to apply a separate binding member along said latter line of fold to prevent unfolding of the band at said latter line of fold.

6. A machine as described in claim 1, wherein the cutter is mounted on vertically reciprocating support means provided with a cam follower, mechanism for actuating the band feeding means includes a driving member provided with a cam engageable by said cam follower, and said cutter is moved into lowered position in response to interengagement of said cam and cam follower.

References Cited in the file of this patent

UNITED STATES PATENTS

| | | |
|---|---|---|
| 659,937 | Olden | Oct. 16, 1900 |
| 851,186 | Strong | Apr. 23, 1907 |
| 1,392,795 | Reed | Oct. 4, 1921 |
| 2,172,570 | Sigoda | Sept. 12, 1939 |
| 2,304,799 | Cosentino | Dec. 15, 1942 |
| 2,593,589 | McIntyre | Apr. 22, 1952 |

FOREIGN PATENTS

| | | |
|---|---|---|
| 116,323 | Germany | Dec. 21, 1900 |